April 2, 1963  C. E. COMPTON  3,083,955
MINING MACHINES HAVING PARALLEL AUGER STRINGS
Original Filed April 7, 1958  2 Sheets-Sheet 1

INVENTOR.
Charles E. Compton
BY
his ATTORNEYS

April 2, 1963 C. E. COMPTON 3,083,955
MINING MACHINES HAVING PARALLEL AUGER STRINGS
Original Filed April 7, 1958 2 Sheets-Sheet 2
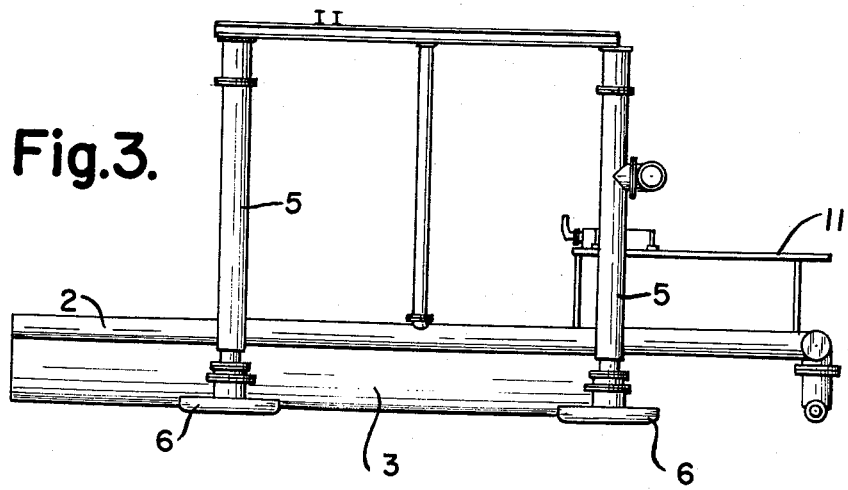
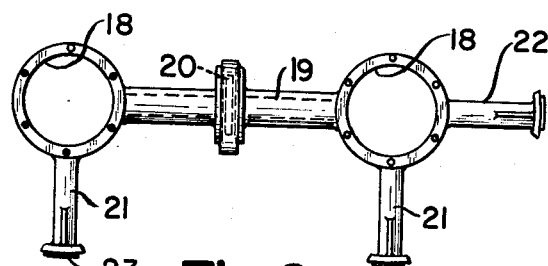
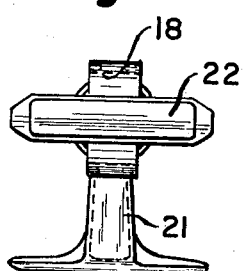
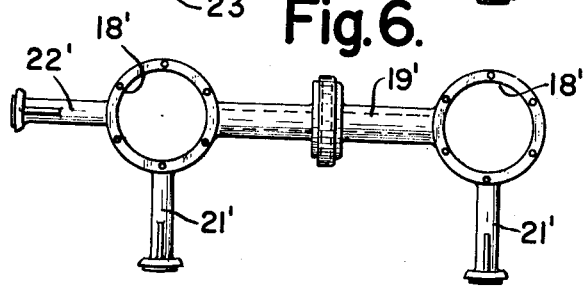
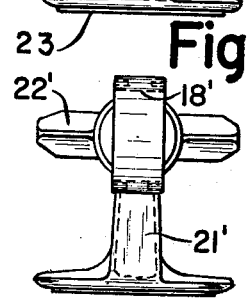
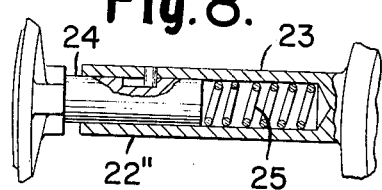
INVENTOR.
Charles E. Compton
BY
his ATTORNEYS

United States Patent Office 3,083,955
Patented Apr. 2, 1963

3,083,955
MINING MACHINES HAVING PARALLEL AUGER STRINGS
Charles E. Compton, Box 1946, Clarksburg, W. Va.
Continuation of application Ser. No. 726,968, Apr. 7, 1958. This application Apr. 11, 1961, Ser. No. 103,682
4 Claims. (Cl. 262—26)

This invention relates to a mining machine and particularly to a mining machine having a plurality of screw conveyors disposed side by side with cutting heads connected with the screw conveyors at the forward ends thereof. Machines employing screw conveyors with cutting heads connected therewith at the forward ends thereof are generally referred to in the art as auger mining machines.

Auger mining machines are disclosed, for example in my Patents Nos. 2,616,677, 2,719,708 and 2,764,397. All of those machines are single auger machines. They have proved very satisfactory in use. However, I have discovered how to greatly increase the production of an auger mining machine per unit of time and also increase the output efficiency of the machine. I employ a plurality of augers disposed side by side, to wit, a plurality of screw conveyors each having a cutting head connected therewith at the forward end thereof. It has heretofore been proposed to utilize a so called multiple head on an auger mining machine employing a single auger but such multiple head machines as have been built and tried out have not been found fully satisfactory. I have found that in order to obtain full advantage of a plurality of cutting heads there must be a separate screw conveyor behind and in alignment with and functionally cooperating with each head.

I provide a mining machine comprising a supporting structure having a substantially straight guideway, a carriage movable along the guideway, means for moving the carriage along the guideway, a plurality of driving mechanisms respectively rotatable about axes parallel to the guideway carried by the carriage, means for rotatably driving said mechanisms, a screw conveyor connected with and rotatably driven by each of the driving mechanisms and movable with the carriage as the carriage moves along the guideway, the screw conveyors extending forwardly from and being generally coaxial with the respective driving mechanisms, and a cutting head connected with each screw conveyor at the forward end thereof. The cutting heads and screw conveyors are somewhat spaced apart so that the respective bores formed thereby in use of the mining machine may be separated by a wall of the material being mined. I preferably provide breaking means connected and advanceable with the screw conveyors and cutting heads and disposed in position to break said wall of the material being mined. I also preferably provide bearing means in which the screw conveyors are journaled and which maintain them spaced apart a predetermined distance. Desirably the breaking means are carried by the bearing means.

I preferably provide bearing means adjacent the forward and rearward ends of the screw conveyors in which the screw conveyors are journaled and which maintain them spaced apart a predetermined distance. At least the bearing means adjacent the forward ends of the screw conveyors preferably carry breaking means to break the wall of the material being mined which may remain between the bores. Guiding means are preferably connected with the bearing means and project therefrom for engaging the bores formed by the mining machine in the material being mined to guide the screw conveyors and cutting heads relatively thereto. The guiding means are preferably positioned to engage the lower portions of the bores to hold up the screw conveyors and cutting heads and to engage the sides of the bores toward which the screw conveyors and cutting heads tend to drift due to the action thereof on the material being mined. At least certain of the guiding means are preferably preloaded to insure their continuously pressing against the bore.

Other details, objects and advantages of the invention will become apparent as the following description of a present preferred embodiment thereof proceeds.

In the accompanying drawings I have shown a present preferred embodiment of the invention in which:

FIGURE 3 is a side elevational view of the mining machine shown in FIGURES 1 and 2 also omitting certain of the elements shown in FIGURE 1 and certain of the elements shown in FIGURE 2 for clearer showing of the remaining elements of the machine;

FIGURE 4 is an enlarged rear elevational view of the head pilot or front bearing structure;

FIGURE 5 is a view of the head pilot as seen from the right viewing FIGURE 4;

FIGURE 6 is an enlarged elevational view of the rear pilot or rear bearing structure;

FIGURE 7 is a view of the rear pilot as seen from the right viewing FIGURE 6; and FIGURE 8 is an enlarged sectional view of a guiding means having preload capability.

Figure 1:
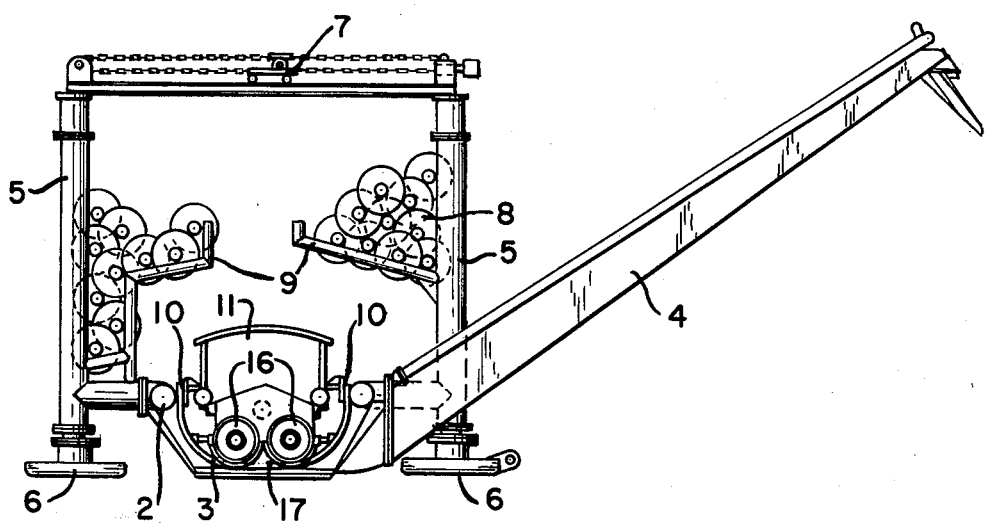
FIGURE 1 is a front elevational view of a mining machine.

Referring now more particularly to the drawings, the mining machine comprises a supporting structure of a type now well known in Comption mining machines and similar to the supporting structures shown in my above mentioned patents, so the supporting structure is shown only in a general way and will not be described in detail. It includes a main frame 2 in which is mounted a belly pan 3 into which the material being mined is delivered from left to right, viewing FIGURES 2 and 3, the belly pan having through the bottom thereof an opening through which the mined material passes onto a conveyor mounted in a boom 4 and having an endless conveying element at least one reach of which passes under the belly pan to convey laterally of the machine and upwardly along the boom the material passing through the opening in the belly pan. The main frame 2 is supported by jacklegs 5 mounted on drag bases or pontoons 6. The jacklegs carry a superstructure on which is mounted a transversely traversing winch 7 which is provided with means for handling screw conveyor sections 8 which are carried in racks 9. All of the mechanism thus far described is known in the art.

The main frame 2 carries tracks 10 at opposite sides of the main frame, the tracks constituting a substantially straight guideway extending longitudinally of the main frame and of the machine. Mounted for guide movement along the main frame by the guideway is a carriage 11 in which is mounted a motive unit which may, for example, be a gasoline engine. The motive unit drives the carriage back and forth along the tracks 10.

The motive unit in the carriage 11 may also drive a hydraulic pump for supplying for operation of the machine hydraulic fluid under pressure. The hydraulic fluid may operate through suitable gearing and clutch connections a transmission 12 having a plurality of driving mechanisms 13 which are driven to rotate about axes parallel to the guide way. Two driving mechanisms 13 are shown, they terminate in sockets of polygonal internal shape respectively adapted to receive in mating relationship the polygonal end portions 14 of two screw conveyor sections 15 which are disposed in side by side relationship with their axes parallel to the tracks 10 and to each other and each in axial alignment with one of the driving mechanisms 13. Any suitable means such as removable coupling pins passing through aligned holes in the sockets and end portions 14 may be provided to prevent undesired separation of the carriage and the conveyor sections when the carriage moves to the right viewing FIGURE 2.

Figure 2:
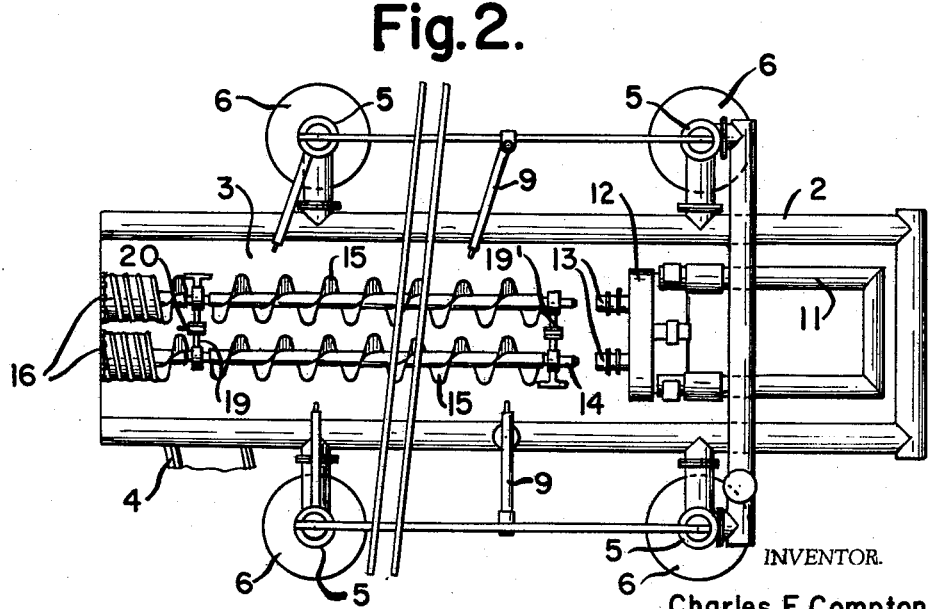
FIGURE 2 is a top plan view of the mining machine shown in FIGURE 1 but omitting certain of the elements shown in FIGURE 1 for clearer showing of the remaining elements of the machine.

FIGURE 2 shows the ends 14 of the screw conveyor sections removed from the sockets of the driving mechanisms but it is to be understood that when the machine is in the process of mining the ends of the screw conveyor sections are in the sockets and the screw conveyor sections are driven by the driving mechanisms 13. The transmission is such that the screw conveyor sections 15 both turn clockwise looking forward of the machine, i.e., from right to left viewing FIGURE 2, when the machine is in operation. A cutting head 16 is connected with each of the screw conveyor sections 15 at the forward end thereof. A pilot pan 17 similar to that of my Patent No. 2,719,708 is preferably provided at the forward end of the main frame 2 for guiding or piloting the heads 16 into the body of material being mined, which is normally coal. The heads 16 may be of an appropriate construction, such, for example, as shown in my Patents Nos. 2,562,841, 2,594,256 and 2,784,955.

Bearing means for the conveyor sections and cutting heads are provided, the bearing means being shown to enlarged scale in FIGURES 4-7. The forward bearing means or head pilot is shown in FIGURES 4 and 5. It comprises a transverse connection portion 19 having a bearing portion 18 at each side, the respective conveyor sections 15 adjacent the forward ends thereof being journaled in the respective bearing portions 18. The head pilot is disposed closely behind the cutting heads 16. Similarly the conveyor sections 15 adjacent their rearward ends are journaled in the rear bearing means or rear pilot shown in FIGURES 6 and 7 and comprising a transverse connecting portion 19' having a bearing portion 18' at each side, the respective conveyor sections 15 adjacent the rearward ends thereof being journaled in the respective bearing portions 18'. The bearing means maintain the conveyor sections 15 spaced apart a predetermined distance. FIGURES 4 and 6 are views looking forward or in the direction from right to left viewing FIGURE 2.

As shown the cutting heads 16 and screw conveyors 15 are somewhat spaced apart so that the respective bores formed thereby in use of the mining machine may be separated by a wall of the material being mined. I provide breaking means connected and advanceable with the screw conveyors and cutting heads and disposed in position to break the wall of the material being mined between the bores. The breaking means are preferably carried by the bearing means, at least by the head pilot. If desired both pilots may carry breaking means. I show breaking means 20 mounted to face forwardly on the central portion of the head pilot. The breaking means preferably comprise spike-like projections which as the head pilot advances enter and break any wall of material which may remain standing between the two bores.

I provide guiding means connected with the bearing means and projecting therefrom for engaging the bores formed by the mining machine in the material being mined to guide the cutting heads and screw conveyors relatively thereto. The head pilot has a downwardly extending leg 21 on each of the bearing portions thereof and an outwardly horizontally extending leg 22 on the right hand bearing portion viewing FIGURE 4. The rear pilot has a downwardly extending leg 21' on each of the bearing portions thereof and an outwardly horizontally extending leg 22' on the left hand bearing portion viewing FIGURE 6. A skid or runner 23 is mounted on the outer end of each leg. The skids or runners 23 are shown as being elongated in the direction of the bore (see FIGURES 5 and 7), but they may be round or of button shape if desired. The legs 21 and 21' engage the lower portions of the bores to hold up the heads and conveyors and the legs 22 and 22' engage the sides of the bores toward which the heads and conveyors tend to drift due to the action thereof on the material being mined. The heads and conveyors rotate clockwise as viewed looking from right to left in FIGURE 2 and there is a tendency due to the action thereof on the material being mined for the heads and the forward ends of the conveyors to move downwardly and toward the right as they advance in the body of material being mined. The rearward ends of the conveyors tend to move toward the left. Such drifting or skewing is obviated by the legs 22 and 22'.

I desirably preload at least certain of the guiding means to insure their continuously pressing against the bore. The preloading may be through the building up of the skids as by applying shims thereto or by making the legs 22 or 22' in two parts 23 and 24 as shown for an analogous leg 22" in FIG. 8 with a spring 25 inside tending to elongate them or move the skids outwardly or toward the bore. Normally it is desirable to preload the horizontal legs 22 and 22' but not the vertical legs 21 and 21'.

My machine operates in the general manner of the Compton single auger mining machine in that the heads and auger sections are advanced into the coal as they are being driven and when the carriage 11 reaches the forward end of the guideway or tracks, i.e., the left hand end viewing FIGURE 2, the carriage is uncoupled from the rear ends of the conveyor sections 15 and moved back to the right hand end of the guideway, additional auger sections are set in place and connected between the front auger sections and the carriage and the operation is repeated in a manner now well known to those skilled in the art. Many auger sections may be used connected end to end, but always the same number of screw conveyors are employed as there are heads, there being a screw conveyor behind and in alignment with each head.

This application is a continuation of my copending application Serial No. 726,968, filed April 7, 1958, and now abandoned.

While I have shown and described a present preferred embodiment of the invention it is to be distinctly understood that the invention is not limited thereto but may be otherwise variously embodied within the scope of the following claims.

What is claimed is:

1. An auger machine for removing material forming a passageway in the operation thereof comprising a supporting structure, a carriage movably supported on said structure for guided rectilinear reciprocal movement into and out of such a passageway of a mine face, plural output drive means operatively connected to said carriage for movement therewith, means mounted on said carriage for rotating said output drive means, longitudinally extending plural screw conveying means operatively connected at their respective rear end portions to said drive means for rotation thereby, said conveying means rotating on axes substantially parallel to the direction of motion of said carriage wherein said axes are coplanar, a cutting head mounted coaxially on the forward portion of each of said conveying means, a first bearing guide member mounted on said forward portions of said conveying means wherein said guide member has a laterally extending portion and downwardly extending portions, a second bearing guide member mounted on said rearward portion of said conveying means having a laterally extending portion and downwardly extending portions, and said portions respectively engaging the side walls of the passageway to guide the advance of said cutting heads wherein said laterally extending portions of said guide members extend in opposite directions.

2. An auger mining machine having a plurality of rotatable and axially movable parallel aligned auger strings, each of said auger strings having a forward outer end and a rearward end wherein each rearward end is connected to drive and feed means mounted on a base, each of said auger strings having a circular cutter head at its outer forward end, the uppermost end of each cutter head being rotated in a direction having a first component directed radially inwardly defining a first direction and a second component directed tangentially outwardly defining a second direction, a first guide means mounted on said forward ends of said auger strings for maintaining said auger strings in parallelism, said first guide means having downwardly extending guide portions and a laterally extending guide portion which last mentioned guide portion extends in said second mentioned direction, a second guide means mounted on said rearward ends of said auger strings for maintaining said auger strings in parallelism, said second guide means having downwardly extending guide portions and a laterally extending guide portion which said laterally extending guide portion of said second guide means extends in a direction opposite to said laterally extending guide portion of said first guide means and wherein said laterally extending guide portions extend outwardly to engage the side walls of a passageway formed by excavation performed by said auger strings.

3. An auger mining machine having a plurality of rotatable and axially movable parallel aligned auger strings, each of said auger strings having a forward outer end and a rearward end, each of said auger strings having a circular cutter head at its outer forward end wherein each auger string extends from drive and feed means mounted on a base, the uppermost end of said cutter head being rotated in a direction having a first component directed radially inwardly defining a first direction and a second component directed tangentially outwardly defining a second direction, a first guide means mounted on said forward ends of said auger strings for maintaining said auger strings in parallelism, said first guide means has downward extending guide portions and a laterally extending guide portion which extends in said second mentioned direction, a second guide means mounted on the rearward ends of said auger strings for maintaining said auger strings in parallelism, said second guide means has downwardly extending guide portions and a laterally extending guide portion which extends in a direction opposite to said laterally extending guide portion of said first guide means and wherein said laterally extending guide portions extend radially outwardly to the radial outer limits of said auger string.

4. An auger mining machine having a plurality of parallel auger strings each carrying a cutter head at its outer end and extending from drive and feed means mounted on a base, interconnecting means respectively mounted at each end of said auger strings for maintaining said auger strings in spaced relationship, each of said interconnecting means having a radially extending guide portion which extends outwardly to substantially the same radial outer limits as said cutter heads, said guide portions at each of said auger string ends respectively including oppositely extending laterally extending portions which maintain the axes of said auger strings in a coplanar relationship.

References Cited in the file of this patent

UNITED STATES PATENTS

| | | |
|---|---|---|
| 2,086,141 | Spataro | July 6, 1937 |
| 2,751,203 | Compton | June 19, 1956 |
| 2,864,601 | McCarthy et al. | Dec. 16, 1958 |
| 2,940,740 | Adams | June 14, 1960 |